United States Patent
Renoud-Grappin (10) Patent No.: US 7,085,482 B2
(45) Date of Patent: Aug. 1, 2006

(54) AQUARIUM WATER HEATER

(75) Inventor: Philippe François Renoud-Grappin, Metz-Tessy (FR)

(73) Assignee: Aquarium Pharmaceuticals, Inc., Chalfont, PA (US)

( * ) Notice: Subject to any disclaimer, the term of this patent is extended or adjusted under 35 U.S.C. 154(b) by 161 days.

(21) Appl. No.: 10/944,994

(22) Filed: Sep. 20, 2004

(65) Prior Publication Data
US 2006/0083498 A1 Apr. 20, 2006

(51) Int. Cl.
*F24H 1/10* (2006.01)

(52) U.S. Cl. .................. 392/478; 219/494; 219/510
(58) Field of Classification Search ............... 392/465, 392/466, 478, 479; 219/494, 507–510, 515
See application file for complete search history.

(56) References Cited

U.S. PATENT DOCUMENTS

| | | | |
|---|---|---|---|
| 2,511,902 A | 6/1950 | Cabrera | |
| 2,811,629 A | 10/1957 | Danner | |
| 3,746,836 A | 7/1973 | Summerfield et al. | |
| 4,238,812 A | 12/1980 | Middleman et al. | |
| 4,276,466 A | 6/1981 | Middleman et al. | |
| 4,327,281 A * | 4/1982 | Jager et al. | 219/523 |
| 4,329,726 A * | 5/1982 | Middleman et al. | 361/58 |
| 4,358,667 A | 11/1982 | Johnson et al. | |
| 4,379,220 A * | 4/1983 | Middleman et al. | 392/497 |
| 4,983,813 A * | 1/1991 | Van Tulleken et al. | 219/523 |
| 5,113,057 A * | 5/1992 | Tsai | 219/523 |
| 5,392,380 A * | 2/1995 | Tsai | 392/498 |
| 5,444,227 A | 8/1995 | Chestnut | |
| 5,465,014 A | 11/1995 | Avvisati | |
| 5,568,587 A * | 10/1996 | Marioni | 392/498 |
| 5,750,960 A | 5/1998 | Bresolin | |
| 5,834,741 A | 11/1998 | Tseng | |
| 6,118,934 A * | 9/2000 | Tseng | 392/503 |
| 6,393,213 B1 | 5/2002 | Bresolin | |
| 6,555,797 B1 | 4/2003 | Pauli | |
| 6,584,280 B1 * | 6/2003 | Wang | 392/498 |

* cited by examiner

*Primary Examiner*—Thor S. Campbell
(74) *Attorney, Agent, or Firm*—Akin Gump Strauss Hauer & Feld, LLP (57) ABSTRACT

An aquarium water heater includes a hollow heat-conducting internal tube with an electric resistance heater element and electrical connections disposed adjacent an outer surface of the hollow heat-conducting internal tube, a temperature thermal cut-out switch electrically connected to the heater element for overheat protection, and a heat-conducting, electrically insulating polymeric filler spaced between the internal tube and an external tube that circumscribes the internal tube and the heater element. The aquarium water heater also includes a water temperature sensor that senses the temperature of water into which the heater is at least partially immersible, electrically coupled to a controller to activate and deactivate the heater element and to an indicator that indicates a condition that corresponds to the water temperature being in between a first predetermined minimum temperature and a first predetermined maximum temperature and a different indicating pattern corresponding to the water temperature dropping below a second predetermined minimum temperature or exceeding a second predetermined maximum temperature.

29 Claims, 6 Drawing Sheets

AQUARIUM WATER HEATER

BACKGROUND OF THE INVENTION

This invention generally relates to water heaters, more particularly, to flow-through water heaters used in aquariums.

Flow-through water heaters used in aquariums are known in the art. One conventional flow-through aquarium water heater uses an electrical resistance heating element on an inner tube and is enclosed by an outer tube. Water that flows through the inner tube is sufficiently heated but water making contact with the outer tube is not adequately heated due to insulation between the inner tube and the outer tube. Thus, the outer tube does not conduct sufficient heat to the aquarium water.

Heaters that include thermostats with excess heat protection circuits and indicator lights are also known in the art. An indicator light is lit for high water temperature conditions but no indicator exists for low water temperature conditions. Furthermore, these heaters have no flow through capability and produce less sufficient heating.

A need exists, therefore, for an aquarium water heater with flow-through capabilities and enhanced heat transfer through the external tube. A need also exists for a water temperature monitor even when the heater element is not activated and indicator patterns that differentiate various temperature conditions. The present invention satisfies these needs and provides other advantages and benefits that will be apparent from the following disclosure.

BRIEF SUMMARY OF THE INVENTION

Briefly stated, the present invention includes an aquarium water heater comprising: a hollow heat-conducting internal tube; an electric resistance heater element with electrical connections, the heater element disposed adjacent an outer surface of the hollow heat-conducting internal tube; a temperature thermal cut-out switch electrically connected to the heater element for overheat protection when the temperature of the heater element exceeds a predetermined maximum value; a hollow heat-conducting external tube spaced from and circumscribing the internal tube and the heater element; a heat-conducting, electrically-insulating polymeric filler filling a space between the internal tube and the external tube and sealing the heater element between the internal tube and the external tube; a controller electrically coupled to the heater element to activate and deactivate the heater element; an indicator electrically coupled to and responsive to the controller; and a water temperature sensor electrically coupled to the controller; the water temperature sensor sensing the temperature of water into which the heater is at least partially immersible and providing a corresponding electrical signal to the controller and monitoring the temperature of the water regardless of whether the heater element is activated; the controller activating the heater element when the temperature of the water is below a first predetermined minimum temperature and deactivating the heater element when the temperature of the water is above a first predetermined maximum temperature, and further activating the indicator when the water temperature is below a second predetermined minimum temperature and when the water temperature is above a second predetermined maximum temperature.

BRIEF DESCRIPTION OF THE SEVERAL VIEWS OF THE DRAWINGS

The foregoing summary, as well as the following detailed description of presently preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Certain terminology is used in the following description for convenience only and is not limiting. The words "right," "left," "upper" and "lower" designate directions in the drawings to which reference is made. The words "inwardly" and "outwardly" refer to directions toward and away from, respectively, the geometric center of the aquarium water heater designated parts thereof. The word "a" is defined to mean "at least one." The terminology includes the words above specifically mentioned, derivatives thereof, and words of similar import.

Figure 7:
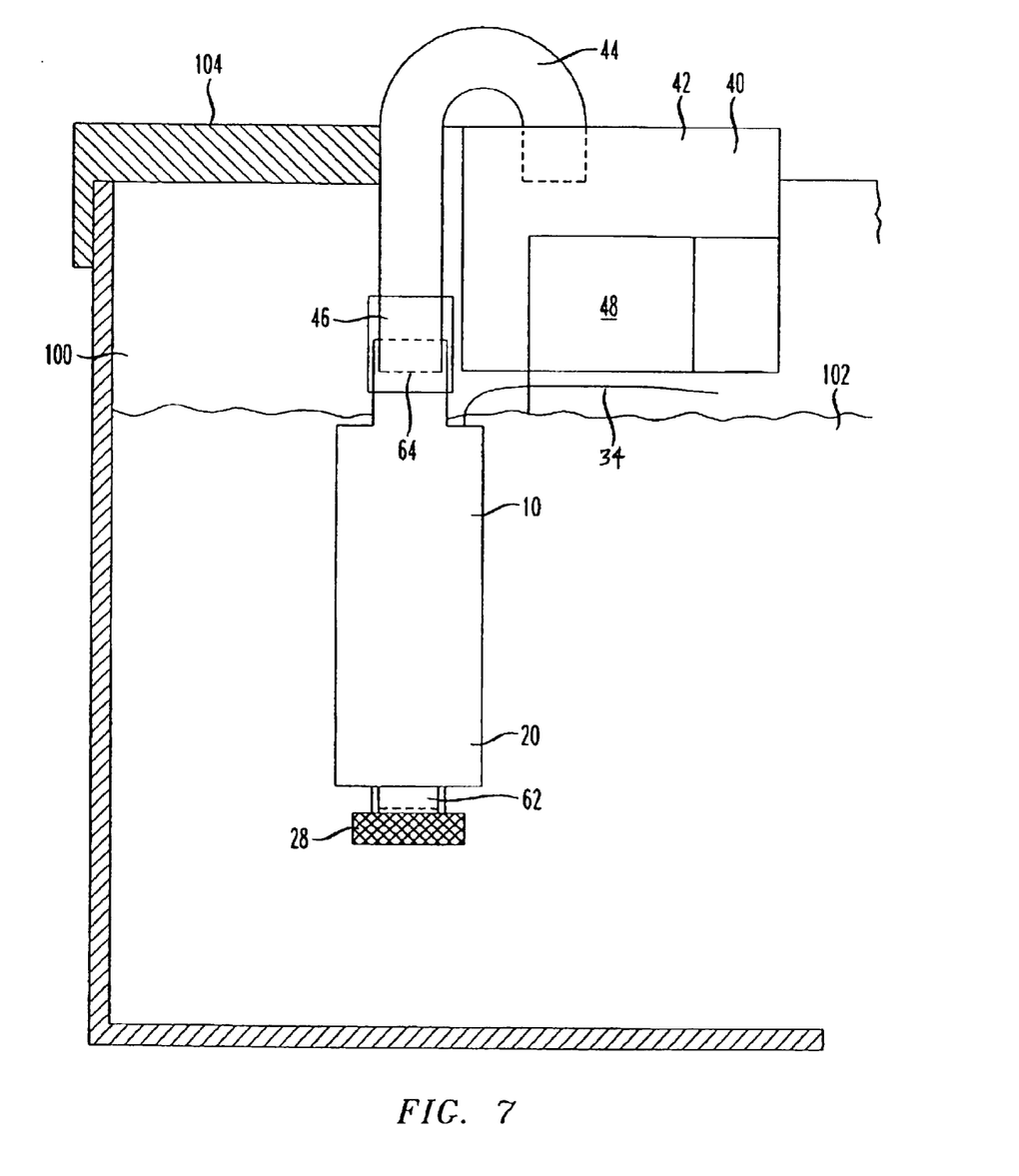
FIG. 7 is a partial vertical cross-section view of an aquarium tank showing in side elevation a preferred embodiment of the aquarium water heater connected to an aquarium water filter.

Referring to the drawings in detail, wherein like numerals indicate like elements throughout the figures, there is shown an aquarium water heater, generally designated 10, which is used to heat water within an aquarium. Referring to FIG. 7, the aquarium water heater 10 is adapted for connection to a water inlet line 44 for an aquarium filter water pump 42 within an aquarium 100. Alternatively, the heater 10 could be connected to a water line, such as an inlet line, for a canister-type filter (not shown) preferably for use in an aquarium or for heating water used for other purposes. If desired, the heater could merely be immersed in water 102 in the aquarium 100, and still heat the water 102 effectively.

The aquarium water heater 10 comprises a hollow heat-conducting internal tube 12 with an electric resistance heater element 14 disposed adjacent an outer surface 12a of the hollow heat-conducting internal tube 12. The electric resistance heater element 14 has a first end 14a and a second end 14b that are connected to first and second electrical connections 16a, 16b. A temperature thermal cut-out switch 18 is electrically connected to the heater element 14 for overheat protection when the temperature of the heater element 14 exceeds a predetermined maximum value. A hollow heat-conducting external tube 20 is spaced from and circumscribes the internal tube 12 and the heater element 14. A heat-conducting, electrically insulating polymeric filler 22 fills a space between the internal tube 12 and the external tube 20, sealing the heating element 14 between the internal tube 12 and the external tube 20.

Figure 8:
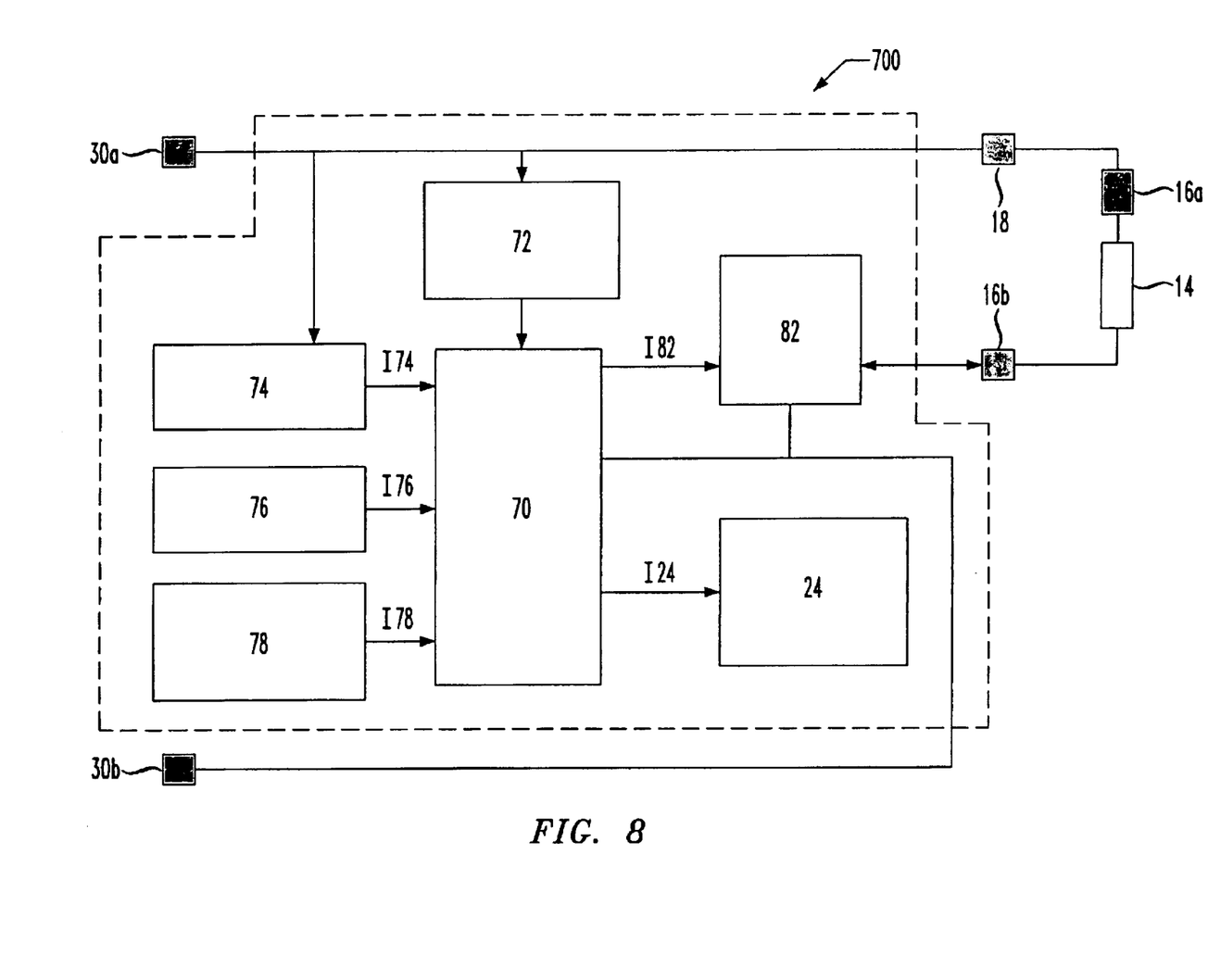
FIG. 8 is a schematic diagram illustrating an electronic circuit used in the aquarium water heater.
Figure 9:
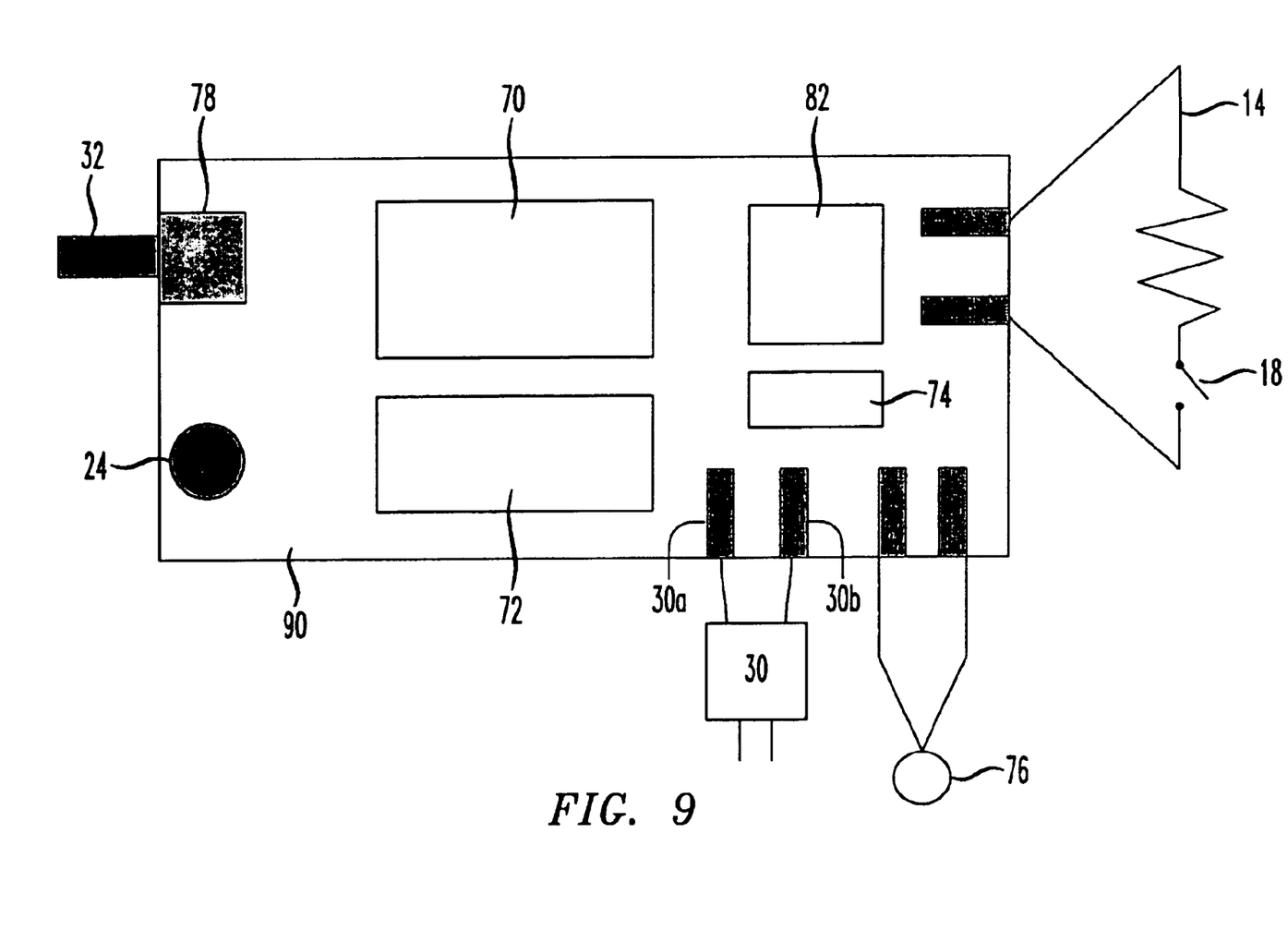
FIG. 9 is a schematic diagram of a printed circuit board used in the aquarium water heater.

Referring to FIGS. 8–9, the aquarium water heater 10 further comprises a control circuit 700. The control circuit 700 includes a water temperature sensor 76 and a controller 70. The controller 70 may be a microcontroller, a microprocessor, an application specific integrated circuit (ASIC), a programmable logic array (PAL) and the like, or may simply be implemented with a variety of discrete electrical and electronic components. The water temperature sensor 76, such as a thermistor, is electrically coupled to the controller 70 to provide an analog input to the controller 70 that corresponds to sensed or measured water temperature. For example, the temperature sensor 76 may provide 0.5–4.5 volts DC which corresponds to 20°–32° C. (68°–90° F.). Of course other signals and ranges may be utilized. The control circuit 700 may also include a selectable temperature setpoint input device 78 that provides a temperature setpoint to the controller 70. The selectable temperature setpoint input device 78 may be a potentiometer, a slide-wire, a keypad, a switch and the like. The water temperature sensor 76 senses the temperature of the water into which the heater 10 is at least partially immersible and provides a corresponding electrical signal to the controller 70. The water temperature sensor 76 and associated circuitry monitor the temperature of the water regardless of whether the heater element 14 is activated. The control circuit 700 may also include a switching device 82 coupled to and responsive to the controller 70 to selectively activate the heater element 14 when the temperature of the water falls below a first predetermined minimum temperature and to deactivate the heater element 14 when the temperature of the water exceeds a first predetermined maximum temperature. The control circuit 700 further activates an indicator 24 when the water temperature is below a second predetermined minimum temperature and when the water temperature is above a second predetermined maximum temperature. Preferably, the selectable temperature setpoint input device 78 inputs a signal, analog or digital, which corresponds to a desired temperature setting, such as 26° C. (79° F.), which the controller 70 can utilize to compare to the actual temperature as sensed by the water temperature sensor 76 for providing the various output controls.

Figure 3:
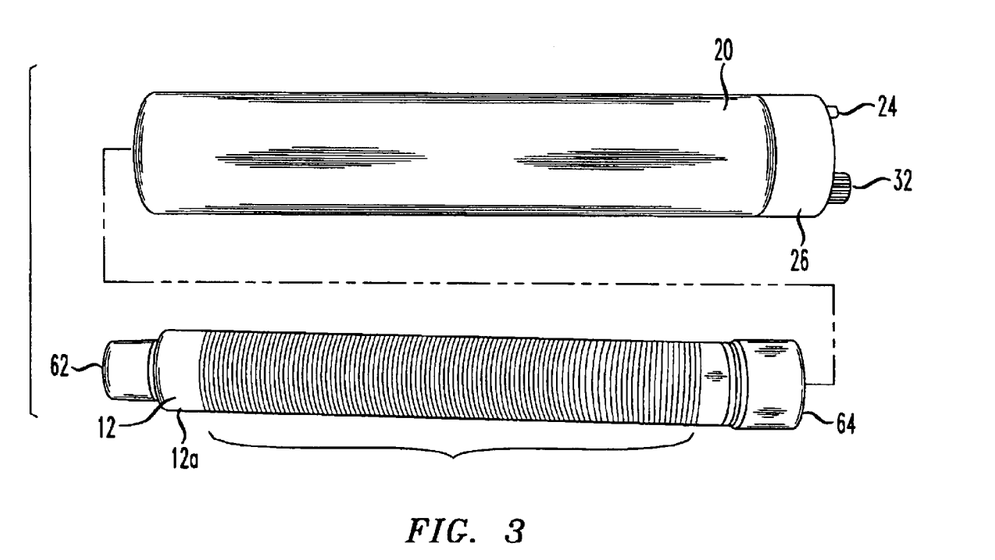
FIG. 3 is an exploded side elevation view of an internal tube and an external tube of the aquarium water heater in accordance with another preferred embodiment of the present invention.
Figure 4:
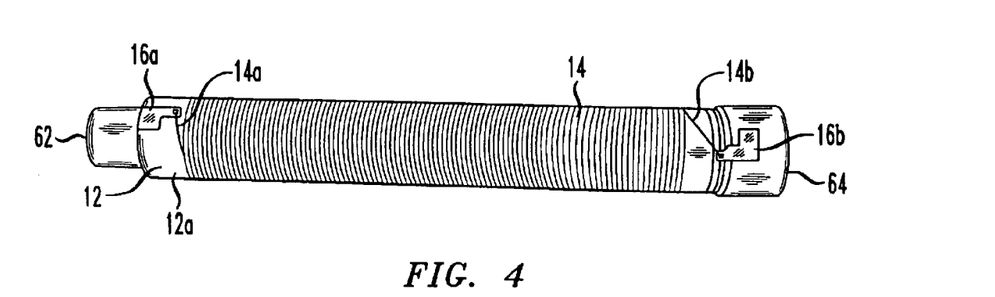
FIG. 4 is a side elevation view of the internal tube of FIG. 3 with an electric resistance heater element and electrical connections.
Figure 5:
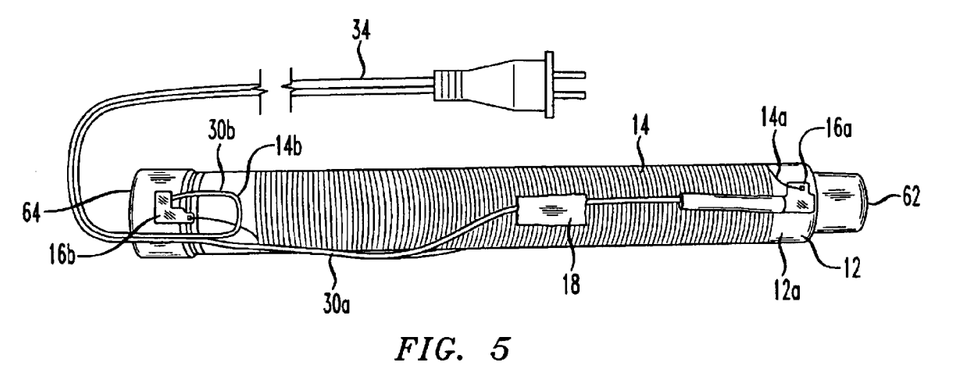
FIG. 5 is a side elevation view of the internal tube of FIG. 4 with a thermal cut-out switch and an electrical cord.

Referring to FIGS. 3 through 5, the internal tube 12 has an inlet 62 and an outlet 64. The hollow heat-conducting internal tube 12 is preferably made of a heat-conducting synthetic polymer, such as glass-filled polyamide, glass-filled polybutylene terephthalate (PBT), polyimide, glass-filled polycarbonate, glass-filled polyphenylene sulfide or polytetrafluoroethylene (PTFE), for example. One of ordinary skill in the art would recognize that any other heat-conducting material could be substituted, in view of the present disclosure.

The electric resistance heater element 14 surrounds the internal tube 12. The heater element 14 is preferably wound resistance wire. Preferably, the wire is a cupronickel alloy capable of withstanding up to about 300 watts, although a similarly-rated nickel chrome alloy or a nickel iron alloy are also good choices. Alternatively, the heater element 14 may comprise resistive ink printed on an electrically insulating substrate. In one preferred example of this alternative embodiment, the electrically insulating substrate is polyethylene terephthalate. An example of this alternative form of an electrical resistance heater is disclosed in U.S. Pat. No. 6,393,213, the disclosure of which is hereby incorporated herein by reference. One of ordinary skill in the art would recognize that the electric resistance heater element 14 could be constructed of any electrical resistance material, in view of the present disclosure. A first end 14a and a second end 14b of the wire of the heater element 14 are connected to electrical connections 16a, 16b at or near the inlet 62 and outlet 64, respectively, for connection to a power source. The first and second electrical connections 16a, 16b are preferably adhesively attached to the internal tube 12 by an adhesive and embedded within the polymeric filler 22. Alternatively, the electrical connections may be overmolded with the internal tube 12, unitarily formed with the internal tube 12 or mechanically fixed to the internal tube 12.

Figure 6:
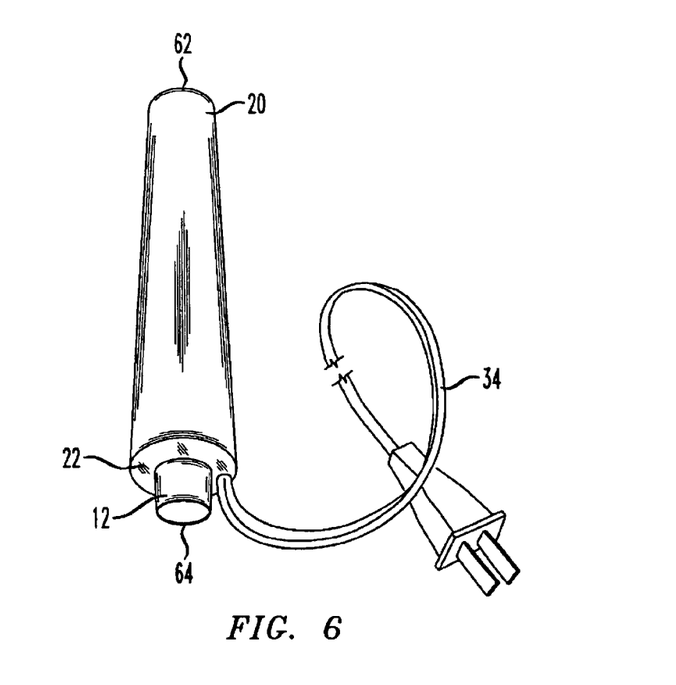
FIG. 6 is a top perspective view of a partially assembled aquarium water heater of FIG. 5.

Referring to FIGS. 5 and 6, the temperature thermal cut-out switch 18 is preferably a bimetallic switch and deactivates the heater 10 when the temperature of the heater 10 preferably reaches a temperature at which a user could be burned, or a fire started, especially if the heater is left on but is not immersed in water. A preferred temperature is about 100° C. (212° F.), and more preferably, about 60° C. (140° F.), since this is low enough to avoid burning users. The temperature thermal cut-out switch 18, which may be made of typical, well-known bimetallic elements, is electrically connected in series to the hot (line) 30a of the alternating current (AC) power cord 34 and to the electrical connection 16a and is preferably embedded within the polymeric filler 22. One of ordinary skill in the art would recognize in view of the present disclosure that the thermal cut-out switch 18 could have any suitable well-known construction.

The heater 10 is powered by a power supply 30. In the preferred embodiment, the power supply 30 is AC. A hot (line) side 30a of the AC power cord 34 is electrically connected to the first electrical connection 16a via the thermal cut-out switch 18 and a neutral side 30b is connected to the second electrical connection 16b. The AC power cord 34 extends near the outlet 64 from the heater, after having been connected to the connections 16a and 16b via the thermal cut-out switch 18, and then partially embedded in filler 22. One of ordinary skill would recognize, in view of the present disclosure, that the hot (line) side 30a and neutral side 30b could be interchanged without departing from the spirit and scope of the present invention. In an alternate embodiment, electrical power is obtained from a low voltage direct current (DC) power source, which may be from at least one battery, or converted from an AC power source.

Referring to FIGS. 1–3 and 6, the external tube 20 is preferably made of a synthetic polymer such as glass-filled polyamide, glass-filled polybutylene terephthalate (PBT), polyimide, glass-filled polycarbonate, glass-filled polyphenylene sulfide or polytetrafluoroethylene (PTFE), for example. One of ordinary skill in the art would recognize that any heat-conducting material could be substituted, in view of the present disclosure.

The polymeric filler 22 that fills the space between the tubes 12, 20 is of a heat-conducting, electrically-insulating material, such as polyurethane resin, epoxy resin, which may be filled with inorganic materials, such as sand or glass beads. One of ordinary skill in the art would recognize in view of the present disclosure that any other initially flowable or viscous, curable, heat-conducting encapsulant material could be used for the polymeric filler 22.

Figure 1:
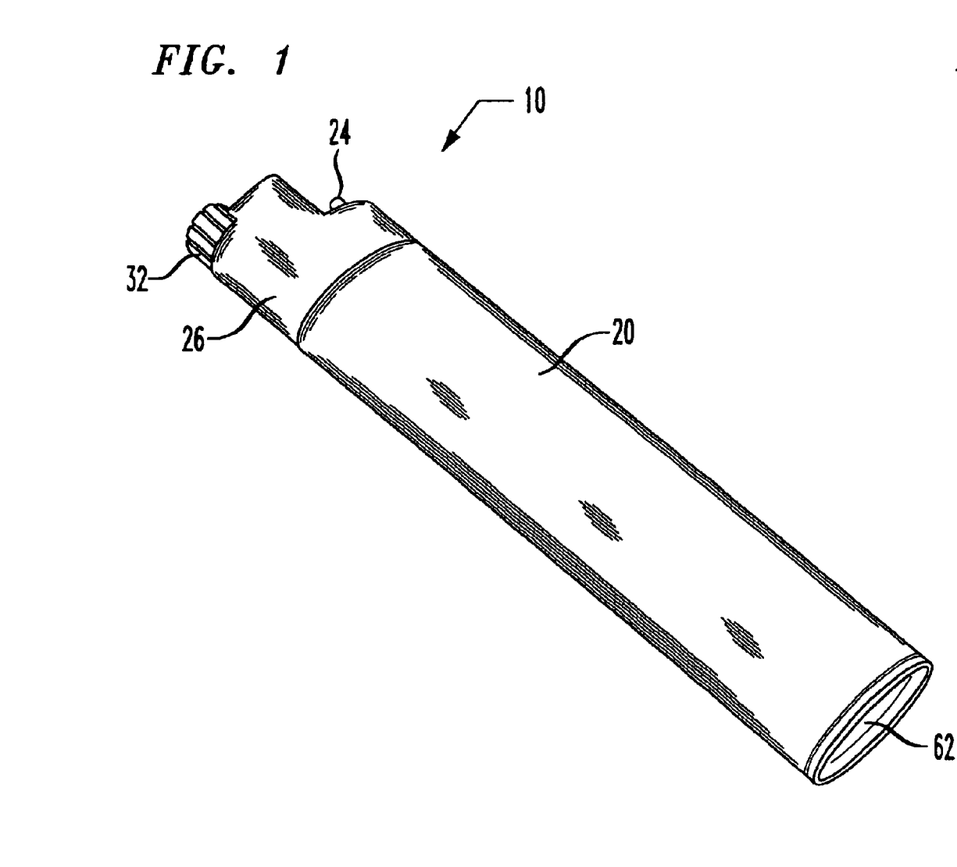
FIG. 1 is a side perspective view of an aquarium water heater in accordance with one preferred embodiment of the present invention.
Figure 2:
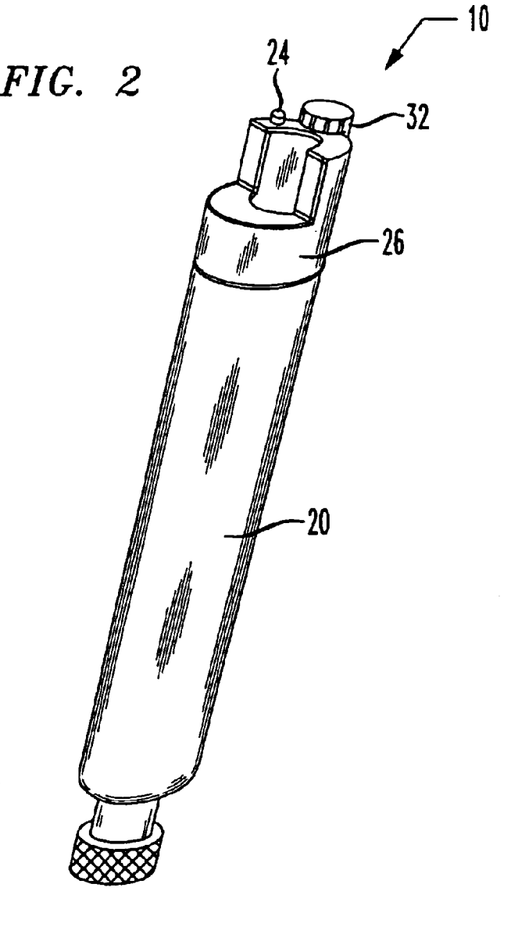
FIG. 2 is a front perspective view of the aquarium water heater of FIG. 1.

Referring to FIGS. 1, 2 and 6, the aquarium water heater 10 preferably has a round (circular) transverse cross-section (FIG. 6) or an elliptical transverse cross-section (FIGS. 1 and 2), or alternatively has a semi-elliptical or triangular cross-section (not shown). One of ordinary skill in the art would recognize in view of the present disclosure that the water heater 10 could take on any shape so long as water is capable of traveling through the internal tube 12. By having an elliptical cross-section, the effective internal and external surface area is increased, and the heater may be shorter than prior art heaters having the same heating capacity. Flow-through heaters also provide quicker heating than solid heaters, since water is heated both inside, as the water flows through the heater, and outside of the heater.

Referring to FIGS. 1, 2 and 9, the control circuit 700 including the water temperature sensor 76, the selectable temperature setpoint input device 78, the indicator 24 and the controller 70, are all enclosed within a housing 26. In the preferred embodiment, the housing 26 is constructed of the same material as the tubes 12, 20 and is sealed water-tight with the internal tube 12 and the external tube 20 for the heater 10 to be at least partially immersible. The housing 26 could also be made of any synthetic polymeric material compatible with water use. Furthermore, it is preferred that the housing 26 has the same transverse cross-sectional shape as the tubes 12, 20.

The water temperature sensor 76 and the controller 70 and associated circuitry monitor the water temperature through the housing 26 regardless of whether the heater element 14 is activated. If desired, the water temperature sensor 76, with or without its associated circuitry, may be located remote from the heater 10 and/or the controller 70 anywhere in the body of water that is being heated. The heater, water temperature sensor 76 and associated circuitry can be electrically connected by appropriate insulated wires. Moreover, the circuitry, if used separately from the water temperature sensor 76 may be removed from the water and hung on the side of the aquarium or other structure containing water. The selectable temperature setpoint input device 78 preferably includes a potentiometer and is adjustable with a temperature adjusting knob 32 located on the exterior of the housing 26. The potentiometer can be replaced by an electronic circuit activated by remote control, in a manner well-known to those skilled in the art. In addition, the selectable temperature setpoint input device 78 causes the controller 70 to activate the heater element 14 when the temperature of the water is below a first predetermined minimum temperature and deactivates the heater element 14 when the temperature of the water is above a first predetermined maximum temperature. Preferably, the first predetermined minimum temperature and the first predetermined maximum temperature are a function of the temperature setpoint, such as being a predetermined amount below and a predetermined amount above the temperature setpoint, respectively. In the preferred embodiment, the first predetermined minimum temperature and the first predetermined maximum temperature are about 0.5° C. (0.9° F.) below and about 0.5° C. (0.9° F.) above the temperature setpoint as adjusted by the selectable temperature input device 78, respectively. While the temperature setpoint can be set at any desired temperature, a typical setting would be one within about 20° C. (68° F.) to about 32° C. (90° F.). Alternatively, the temperature setpoint can be programmed at the factory to a desired temperature for a particular application, e.g., a tropical marine fish temperature setting or a fresh water fish temperature setting.

The water temperature sensor 76 and controller 70 further activate the indicator 24 when the water temperature is below a second predetermined minimum temperature and when the water temperature is above a second predetermined maximum temperature. In the preferred embodiment, the indicator 24 is off when the heater is not activated, and is on in an indicating condition when the heater element 14 is activated and is on in a warning condition when the water temperature is below the second predetermined minimum temperature and above the second predetermined maximum temperature. The warning condition should be different than the indicating condition, but both conditions can be based upon the temperature setpoint. Preferably, each of the second predetermined minimum temperature and the second predetermined maximum temperature is a function of the temperature setpoint, such as being a predetermined amount below and a predetermined amount above the temperature setpoint, respectively. It is preferred that the second predetermined minimum temperature and the second predetermined maximum temperature are about 3° C. (5.4° F.) below and about 3° C. (5.4° F.) above the temperature setpoint, respectively.

The indicator 24 is preferably a light, and more preferably a light-emitting diode (LED) where the indicating condition is a steady glow of light and the warning condition is a flashing light. Alternatively, more than one indicator, preferably lights and more preferably, LEDs, could be used. For example, an indicator that the heater is on could be a green light or LED and a warning indicator could be a steady or flashing red light or LED. The indicator(s) could also be a buzzer, chime or other audible indicator, or could be a transmitter that sends signals to one or more appropriate receivers located on or preferably remote from the heater.

While the first predetermined minimum and maximum temperatures may be greater or less than about ±0.5° C. (0.9° F.) from the temperature setpoint, and the second predetermined minimum and maximum temperature could be greater or less than about ±3° C. (5.4° F.), these preferred minimums and maximums allow adequate control of the temperature and protection of aquatic life typically expected to be within the aquarium without excessive cycling of the heater on and off and without generating false positive or negative warning indications. Adjustments to the first and second predetermined minimum and maximum temperatures could be made readily, in view of the present disclosure, to any specific user requirements or to take into consideration the environment and type of aquatic life expected for the aquarium with which the heater of this invention is intended to be used. This could be accomplished, for example, by changing the controller software for any given production series.

Referring to the control circuit 700 illustrated in the schematic diagram of FIG. 8, the heater 10 is controlled by the controller 70, preferably a microcontroller, by processing electrical signals I74, I76, I78 that are input to the controller 70. In the preferred embodiment, the controller 70 has input/output (I/O) and control programming (code) that utilizes a "dead-band" or trip-point control scheme. One of ordinary skill in the art would recognize in view of the present disclosure that the controller 70 could implement alternative control schemes such as proportional integral derivative control (PID), time proportioning control or any other control algorithm. The controller 70 preferably is powered by a DC power supply 72. In the preferred embodiment, the DC power supply 72 includes a rectifier that converts AC voltage received from the heater power supply 30 to a predetermined DC voltage needed for the controller 70. It is also preferred that the DC power supply 72 include a voltage regulator in the form of an integrated circuit that provides a stable and clean source of DC power. The load side 30a of the power supply 30 feeds power to the DC supply 72. Furthermore, a power synchronization circuit 74 monitors the load side 30a power and outputs a corresponding electrical signal I74 to the controller 70. In the preferred embodiment, the power synchronization circuit 74 is formed with discrete elements or an integrated circuit. Furthermore, it is preferred that the power synchronization circuit 74 provide switching based on zero-cross phase required to prevent noise and interference in the circuit 700 (i.e., "zero-cross fire"). The temperature sensor 76, which may be a thermistor, outputs an electrical signal I76 corresponding to the temperature of the water in the aquarium. In the preferred embodiment, the thermistor 76 is of an analog type but one of ordinary skill in the art will recognize in view of the present disclosure that other types, such as digital components could be substituted. The selectable temperature setpoint input device 78, which preferably includes a potentiometer, outputs an electrical signal I78 that corresponds to the temperature setpoint. In the preferred embodiment, the electrical signals are analog but one of ordinary skill in the art would recognize in view of the present disclosure that the signals could be of other types such as digital signals. The controller 70 processes the input signals I74, I76, I78 and outputs electrical signals I24, I82 to the indicator 24 and the switching device 82, respectively. As previously mentioned, the indicator 24 is activated corresponding to the different temperature conditions. The switching device 82 receives a digital signal I82 from the microcontroller 70 to determine whether power is relayed to the electric resistance heater element 14. In the preferred embodiment, the switching device 82 is a Triode Alternating Current Switch (TRIAC). One of ordinary skill in the art would recognize that any other semiconductor or electrical switch capable of controlling current could be substituted, in view of the present disclosure. The control circuit 700 in FIG. 8 also shows the thermal cut-out switch 18 that is connected to the heater element 14 previously mentioned. The thermal cut-out switch 18 acts as an over temperature protection device, as well as a safety interlock. The circuit shown in FIG. 8 is completed by connecting the switching device 82 to the neutral side 30b of the power supply 30.

Referring to the schematic diagram of FIG. 9, a printed circuit board 90 is located within the housing 26 and includes circuits for the selectable temperature setpoint input device 78 controlled by a potentiometer circuit, a controller 70, a switching device 82, a temperature sensor 76, a DC power supply 72, a power synchronization circuit 74 and a heater power supply 30. The switching device 82 of the printed circuit board 90 is electrically connected to the heating element 14. The printed circuit board 90 is mounted inside of the housing 26 and is potted or sealed with polyurethane or other suitable resin for waterproofing, anti-corrosion and for safety purposes.

FIG. 7 shows one preferred arrangement for using the heater 10 to heat water 102 in an aquarium 100, though, if desired, the heater could be connected to a water inlet supply tube of a canister filter used in an aquarium or with any other device where heated, filtered water is desired. A cover 104 optionally, but preferably, covers at least a portion of the aquarium. Furthermore, one of ordinary skill in the art will recognize in view of the present disclosure that the water heater 10 could be used either completely submersed or partially submersed in the water 102, without being connected to a filter or to any other water inlet. In that case, the heater can be placed in a vertical position, a horizontal position, or any position between vertical and horizontal. The heater 10 is submersed in the aquarium water 102 and preferably is adapted to be connected to a water line 44 for a water pump 42 of an aquarium water filter assembly 40. Preferably, a coupling device 46 connects the outlet 64 of the heater 10 to the water line 44. If desired, the coupling device 46 could be eliminated and a direct mechanical assembly could connect the heater 10 and the water line 44. A strainer 28 is optionally, but preferably, connected to the inlet 62 of the heater 10 to prevent fish or other animal or plant aquatic life from entering the heater and filter. The filter assembly 40 includes a water pump 42 having a motor 48. Power is supplied to the heater 10 preferably by an AC power source through power cord 34, though other sources of power could also be used, including a battery back-up supply. In the preferred embodiment, the water line 44 is a U-tube but one of ordinary skill in the art would recognize in view of the present disclosure that different sizes and different shapes could be substituted.

In operation, a preferred embodiment of the water heater 10 is placed within an aquarium 100, preferably connected to a filter inlet tube 44 as shown in FIG. 7. The AC power cord 34 is connected to a power source 30 and a desired water temperature is set by a user using the temperature adjusting knob 32 of the assembled water heater 10. So long as the water temperature is below the set temperature the heater 10 is activated with the indicator 24 on in an indicating condition, such as a steady glow of light. The heater continues to heat the water until the water temperature reaches about 0.5° C. (0.9° F.) above the set temperature, as detected by the temperature sensor 76. When the water temperature reaches about 0.5° C. (0.9° F.) above the set temperature the microcontroller 70 deactivates the heater 10 and the indicator 24 shuts off. The heater 10 normally remains inactive until the temperature sensor 76 senses that the water temperature is about 0.5° C. (0.9° F.) below the set temperature at which time the controller 70 causes the heater to activate and the indicator to register an indicating or "on" condition until the temperature sensor 76 senses a water temperature about 0.5° C. (0.9° F.) above the set temperature. The indicator 24 turns on steadily when the heater is activated and shuts off when the heater is inactive. Thus, the controller 70 is programmed to maintain the water temperature to within about ±0.5° C. (0.9° F.) of the set temperature (about −0.5° C. (0.9° F.) below the set temperature, the first predetermined minimum, to about +0.5° C. (0.9° F.) above the set temperature, the first predetermined maximum). When the water temperature falls about 3° C. (5.4° F.) below the set temperature (the second predetermined minimum) or exceeds the set temperature by about 3° C. (5.4° F.) (the second predetermined maximum), the indicator 24 provides a warning indication, preferably by a light or LED that flashes, until the water temperature falls within about ±3° C. (5.4° F.) of the set temperature. As mentioned above, the first and second predetermined minimum and maximum temperatures could be adjusted to any specific user requirements, such as by changing the controller software for any given production series.

The warning indicator should be sufficient to alert a user promptly, since temperatures outside of the range of the second predetermined minimum and maximum temperatures could indicate a blockage of water flow through the heater, excessively low or high room temperature, or some defect in the circuitry or other elements, and could be detrimental to aquatic life in the aquarium. Thus, the flashing indicator serves as a warning to check the heater and take appropriate action promptly. Furthermore, the heater element 14 is deactivated by the thermal cutout switch 18 if the heater element 14 reaches a temperature at which a user could be burned, preferably about 100° C. (212° F.) and more preferably, about 60° C. (140° F.), typically if the heater is left plugged in but removed from the aquarium water, or in case of blockage of water flow through the heater, as a safety feature.

Those skilled in the art will appreciate in view of the present disclosure that changes may be made to the embodiment described above without departing from the broad inventive concept thereof. It is understood, however, that this invention is not limited to the particular embodiment disclosed, but is intended to cover modifications within the spirit and scope of the present invention, as described above and the following claims.

I claim:

1. An aquarium water heater comprising:
    a hollow heat-conducting internal tube;
    an electric resistance heater element with electrical connections, the heater element disposed adjacent an outer surface of the hollow heat-conducting internal tube;
    a temperature thermal cut-out switch electrically connected to the heater element for overheat protection when the temperature of the heater element exceeds a predetermined maximum value;
    a hollow heat-conducting external tube spaced from and circumscribing the internal tube and the heater element;
    a heat-conducting, electrically-insulating polymeric filler filling a space between the internal tube and the external tube and sealing the heater element between the internal tube and the external tube;
    a controller electrically coupled to the heater element to activate and deactivate the heater element;
    an indicator electrically coupled to and responsive to the controller; and
    a water temperature sensor electrically coupled to the controller, the water temperature sensor sensing the temperature of water into which the heater is at least partially immersible and providing a corresponding electrical signal to the controller and monitoring the temperature of the water regardless of whether the heater element is activated,
    the controller activating the heater element when the temperature of the water is below a first predetermined minimum temperature and deactivating the heater element when the temperature of the water is above a first predetermined maximum temperature, and further activating the indicator when the water temperature is below a second predetermined minimum temperature and when the water temperature is above a second predetermined maximum temperature.

2. An aquarium water heater as in claim 1, wherein the hollow heat-conducting tubes are comprised of a synthetic polymer.

3. An aquarium water heater as in claim 2, wherein the synthetic polymer is selected from the group consisting of glass-filled polyamide, glass-filled polybutylene terephthalate, polyimide, glass-filled polycarbonate, glass-filled polyphenylene sulfide and polytetrafluoroethylene.

4. An aquarium water heater as in claim 1, wherein the polymeric filler is selected from the group consisting of polyurethane resin and epoxy resin.

5. An aquarium water heater as in claim 1, wherein the heater element is wound wire.

6. An aquarium water heater as in claim 5, wherein the wire is selected from the group consisting of a cupronickel alloy, a nickel chrome alloy and a nickel iron alloy.

7. An aquarium water heater as in claim 1, wherein the heater element comprises resistive ink printed on an electrically insulating substrate.

8. An aquarium water heater as in claim 7, wherein the substrate is polyethylene terephthalate.

9. An aquarium water heater as in claim 1, wherein the indicator is on in an indicating condition when the heater element is activated and in a warning condition when the water temperature is below the second predetermined minimum temperature and above the second predetermined maximum temperature.

10. An aquarium water heater as in claim 1, further comprising:
    a selectable temperature setpoint that is input to the controller.

11. An aquarium water heater as in claim 10, wherein the first predetermined minimum temperature and the first predetermined maximum temperature are about 0.5° C. (0.9° F.) below and about 0.5° C. (0.9° F.) above the selectable temperature setpoint, respectively.

12. An aquarium water heater as in claim 10, wherein the second predetermined minimum temperature and the second predetermined maximum temperature are about 3° C. (5.4° F.) below and about 3° C. (5.4° F.) above the selectable temperature setpoint, respectively.

13. An aquarium water heater as in claim 9, wherein the indicator is a light, the indicating condition is a steady glow of the light, and the warning condition is a flashing light.

14. An aquarium water heater as in claim 13, wherein the light is a light-emitting diode.

15. An aquarium water heater as in claim 1, having a cylindrical transverse cross-section.

16. An aquarium water heater as in claim 1, having an elliptical transverse cross-section.

17. An aquarium water heater as in claim 1, having a semi-elliptical transverse cross-section.

18. An aquarium water heater as in claim 1, having a triangular transverse cross-section.

19. An aquarium water heater as in claim 1, wherein the thermostat is adjustable.

20. An aquarium water heater as in claim 1, wherein the thermal cut-out switch is a bi-metallic switch.

21. An aquarium water heater as in claim 1, wherein the thermal cut-out switch deactivates the heater when the temperature of the heater reaches 100° C. (212° F.).

22. An aquarium water heater as in claim 1, wherein the thermal cut-out switch deactivates the heater when the temperature of the heater reaches 60° C. (140° F.).

23. An aquarium water heater as in claim 1, wherein the thermal cut-out switch is embedded within the polymeric filler.

24. An aquarium water heater as in claim 1, wherein the electrical connections are associated with the internal tube by one of unitary formation with the internal tube, by being over-molded with the internal tube, by mechanical attachment with the internal tube and by adhesive attachment to the inner tube by an adhesive embedded within the polymeric filler.

25. An aquarium water heater as in claim 1, wherein electrical power is obtained from an AC power supply.

26. An aquarium water heater as in claim 1, wherein electrical power is obtained from at least one battery.

27. An aquarium water heater as in claim 1, wherein electrical power is obtained from a low-voltage DC power supply.

28. An aquarium water heater as in claim 1, wherein the heater is adapted for connection to a water line for an aquarium filter water pump by which water flows through the heater from an inlet to an outlet.

29. An aquarium water heater as in claim 28, further comprising a strainer at the heater inlet.

* * * * *